United States Patent
Darbandi et al.

(10) Patent No.: US 12,176,503 B2
(45) Date of Patent: Dec. 24, 2024

(54) STORAGE DEVICE FOR STORING ELECTRICAL ENERGY, IN PARTICULAR FOR A MOTOR VEHICLE

(71) Applicant: Bayerische Motoren Werke Aktiengesellschaft, Munich (DE)

(72) Inventors: Azad Darbandi, Unterfoehring (DE); Frank Eckstein, Feldkirchen-Westerham (DE); Juergen Hildinger, Hoehenkirchen-Siegertsbrunn (DE); Florian Schoewel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 381 days.

(21) Appl. No.: 16/851,403

(22) Filed: Apr. 17, 2020

(65) Prior Publication Data
US 2020/0243929 A1 Jul. 30, 2020

Related U.S. Application Data (63) Continuation of application No. PCT/EP2018/078393, filed on Oct. 17, 2018.

(30) Foreign Application Priority Data

Oct. 18, 2017 (DE) ............ 10 2017 218 578.3

(51) Int. Cl.
*H01M 10/00* (2006.01)
*H01M 10/653* (2014.01)
(Continued)

(52) U.S. Cl.
CPC ....... *H01M 10/655* (2015.04); *H01M 10/653* (2015.04); *H02J 7/0031* (2013.01); *H01M 2200/10* (2013.01); *H01M 2220/20* (2013.01)

(58) Field of Classification Search
CPC ............ H01M 10/655; H01M 10/653; H01M 2200/10; H01M 2220/20; H01M 10/658;
(Continued)

(56) References Cited

U.S. PATENT DOCUMENTS 6,146,778 A * 11/2000 Rouillard ............ H01M 50/296
429/7
8,981,683 B2 * 3/2015 Hambitzer ............ H02J 7/0021
318/434
(Continued)

FOREIGN PATENT DOCUMENTS

CN 102792513 A 11/2012
CN 203481336 U 3/2014
(Continued)

OTHER PUBLICATIONS

International Search Report (PCT/ISA/210) issued in PCT Application No. PCT/EP2018/078393 dated Nov. 21, 2018 with English translation (five (5) pages).
(Continued)

*Primary Examiner* — Nicholas P D'Aniello
(74) *Attorney, Agent, or Firm* — Crowell & Moring LLP (57) ABSTRACT

A storage device for storing electrical energy includes at least two storage cells. Each storage cell has a cell housing, an accommodating space delimited by the cell housing, and at least one storage element for storing electrical energy. The storage element is accommodated in the accommodating space. At least one thermally conductive heat-conducting element is provided, by which heat can be deliberately transferred from a first of the storage cells to the second storage cell.

6 Claims, 3 Drawing Sheets

(51) Int. Cl.
    *H01M 10/655*     (2014.01)
    *H02J 7/00*       (2006.01)
(58) Field of Classification Search
    CPC .. H01M 50/581; H02J 7/0031; H02J 7/00309;
                                                Y02E 60/10
    See application file for complete search history.

(56)             References Cited

U.S. PATENT DOCUMENTS

| | | | | |
|---|---|---|---|---|
| 9,023,516 | B2* | 5/2015 | Kim | H01M 50/358 |
| | | | | 429/82 |
| 9,627,663 | B2* | 4/2017 | Kim | H01M 50/271 |
| 9,806,308 | B2* | 10/2017 | Watanabe | H01M 50/147 |
| 10,243,186 | B2* | 3/2019 | Kruger | H01M 50/317 |
| 10,388,924 | B2* | 8/2019 | Ruehle | H01M 50/394 |
| 10,559,430 | B2* | 2/2020 | Morita | H01G 2/08 |
| 2006/0257729 | A1* | 11/2006 | Lee | H01M 50/103 |
| | | | | 429/61 |
| 2009/0253026 | A1* | 10/2009 | Gaben | B60R 16/04 |
| | | | | 429/120 |
| 2009/0325040 | A1* | 12/2009 | Saito | H01M 10/12 |
| | | | | 429/53 |
| 2010/0052692 | A1* | 3/2010 | Yano | H01M 10/482 |
| | | | | 324/427 |
| 2010/0323228 | A1* | 12/2010 | Okamoto | H01M 10/06 |
| | | | | 29/623.2 |
| 2011/0210703 | A1 | 9/2011 | Souza et al. | |
| 2012/0313560 | A1 | 12/2012 | Hambitzer et al. | |
| 2013/0216887 | A1 | 8/2013 | Wayne et al. | |
| 2013/0330579 | A1* | 12/2013 | Ejiri | H01M 50/30 |
| | | | | 429/53 |
| 2014/0377623 | A1* | 12/2014 | Pyzza | H01M 10/61 |
| | | | | 165/172 |
| 2015/0140369 | A1* | 5/2015 | Itoi | H01M 50/204 |
| | | | | 429/53 |
| 2016/0254522 | A1* | 9/2016 | Johler | H01M 50/581 |
| | | | | 429/61 |
| 2018/0366714 | A1* | 12/2018 | Gong | H01M 10/48 |
| 2019/0074492 | A1* | 3/2019 | Uchida | H01M 50/209 |
| 2019/0157635 | A1* | 5/2019 | Miler | H01M 10/653 |
| 2020/0194819 | A1* | 6/2020 | Aikata | H01M 10/0413 |
| 2022/0017745 | A1* | 1/2022 | Park | H01M 50/204 |

FOREIGN PATENT DOCUMENTS

| | | | | |
|---|---|---|---|---|
| DE | 20 2013 001 662 U1 | 5/2013 | | |
| DE | 102012219784 A1 * | 4/2014 | | H01M 2/1077 |
| DE | 10 2013 200 739 A1 | 7/2014 | | |
| DE | 102013204534 A1 * | 9/2014 | | B60L 11/1862 |
| DE | 202017103777 U1 * | 8/2017 | | B60L 11/1851 |
| JP | 2005339932 A * | 12/2005 | | |
| JP | 2011070871 A * | 4/2011 | | |
| JP | 6427941 B2 * | 11/2018 | | |
| WO | WO 2011/095630 A1 | 8/2011 | | |
| WO | WO 2011/109389 A2 | 9/2011 | | |
| WO | WO 2016/138487 A1 | 9/2016 | | |
| WO | WO-2016147227 A1 * | 9/2016 | | H01M 2/10 |

OTHER PUBLICATIONS

German-language Written Opinion (PCT/ISA/237) issued in PCT Application No. PCT/EP2018/078393 dated Nov. 21, 2018 (seven (7) pages).

Chinese-language Office Action issued in Chinese Application No. 201880053963.4 dated Apr. 3, 2023, with English translation (15 pages).

* cited by examiner

STORAGE DEVICE FOR STORING ELECTRICAL ENERGY, IN PARTICULAR FOR A MOTOR VEHICLE

CROSS REFERENCE TO RELATED APPLICATIONS

This application is a continuation of PCT International Application No. PCT/EP2018/078393, filed Oct. 17, 2018, which claims priority under 35 U.S.C. § 119 from German Patent Application No. 10 2017 218 578.3, filed Oct. 18, 2017, the entire disclosures of which are herein expressly incorporated by reference.

BACKGROUND AND SUMMARY OF THE INVENTION

The invention relates to a storage device for storing electrical energy, in particular for a motor vehicle.

A storage device for storing electrical energy is already known, for example, from DE 10 2013 204 534 A1. The storage device comprises here at least two storage cells which are, for example, connected electrically to one another. The respective storage cell has a respective cell housing, a respective receptacle space which is bounded by the respective cell housing, and at least one respective storage element which is accommodated in the respective receptacle space and has the purpose of storing electrical energy. In particular, the storage element comprises, for example, an electrolyte, in particular a fluid electrolyte. In this context, for example a safety device is provided which can be activated or is activated. By activating the safety device it is possible, for example, to avoid an undesired critical state of the safety device or to counteract such a critical state so that, for example, undesired effects which result from the critical state can be avoided or at least kept within narrow limits.

Furthermore, WO 2011/095630 A1 discloses a high-current battery system in which a high battery current flows, in particular for vehicle drives. In this context, battery system-monitoring electronics and a multiplicity of battery modules are provided which each include at least one rechargeable battery cell and are connected electrically in series by means of a battery power line in such a way that during operation a battery current flows through the battery power line.

The object of the present invention is to provide a storage device of the type mentioned at the beginning so that particularly safe operation can be implemented.

A first aspect of the invention relates to a storage device for storing electrical energy or electrical current, in particular for a motor vehicle such as, for example, a motor car, in particular a passenger car. The storage device has at least two storage cells which each have a cell housing, a receptacle space which is bounded by the cell housing, and at least one storage element which is accommodated in the receptacle space and has the purpose of storing electrical energy. The storage element comprises, for example, an, in particular fluid, electrolyte, at least one electrode and/or an electrode winding, that is to say at least one winding. The respective storage cell also has a safety device which can be activated by which means an undesired critical state, resulting from a thermal event, of the respective storage cell, can be avoided, or such a critical state or the thermal event can be counteracted, for example by activating the safety device.

In order then to be able to implement particularly safe operation of the storage device, the storage device comprises according to the invention at least one thermally conductive heat-conducting element which functions as a heat-transferring element and by means of which heat can be selectively transferred from a first of the storage cells to the safety device of the respective second storage cell. The heat-conducting element is preferably embodied as a component which is embodied separately from the storage cells and which is, in particular, in thermal contact with the respective storage cells. In particular there is provision that the heat-conducting element has, for example, a better or a higher thermal conductivity than the respective storage cell, in particular than the respective cell housing, so that heat can be transferred particularly effectively and efficiently as well as selectively from the first storage cell to the storage device of the second storage cell by means of the heat-conducting element. By means of this selective transmission of heat, which can be implemented by means of the heat-conducting element, from one of the storage cells to the safety device of the respective other storage cell it is possible, for example if there is a thermal event, to transfer a thermal wave from the one storage cell to the storage device of the respective other storage cell, wherein, in particular, it is possible to carry out adjustment of a transmission time of the thermal wave. The transmission time is to be understood as being, in particular, a time or a time period during which heat or the thermal wave is transferred from the one storage cell to the storage device of the respective other storage cell. In particular, the transmission time is the time which is necessary to transfer a certain or a predefinable quantity of heat from the one storage cell to the respective other storage cell.

As a result of the use of the heat-conducting element and as a result of the selective transmission of heat or of the thermal wave, which can be implemented by means of the use of the heat-conducting element, it is possible to activate the safety device of the respective other cell or second cell, in particular thermally, and a result activate safety measures in a selective fashion or in accordance with demand, in particular, in the case of a thermal event, in order as a result, for example, to counteract such a thermal event or in order to avoid effects resulting from the thermal event or at least to keep them within particularly narrow limits.

A thermal event is to be understood, for example within the scope of the present invention, to be, in particular, excessive heating of at least one of the storage cells or of a storage module, wherein the storage module comprises, for example, the storage cells. The storage cells are, for example, connected electrically to one another and in this context connected, in particular, in a serial fashion or in series or in parallel with one another. Such a thermal event occurs, for example, when force is applied to the respective storage cell or the storage module as a result of an accident, wherein such an application of force owing to an accident occurs, for example, when the motor vehicle is in an accident. Such an application of force leads, for example, to hot degassing and to flames, as a result of which the respective storage cell heats up. In particular, within the scope of such a thermal event it may be the case that the thermal event firstly starts at one of the storage cells, while the thermal event has not yet started at the respective other storage cell.

As a result of the thermal event, the one storage cell heats up as time progresses, so that, for example, thermal propagation takes place, within the scope of which not only the one storage cell in which the thermal event has started but also the respective other storage cell is heated. Subsequently, the thermal event passes over from the one storage cell to the other storage cell, so that a thermal event also occurs at the other storage cell. Such a thermal propagation is usually impossible to prevent, but can be selectively influenced or controlled by means of the use of the heat-conducting element and the selective heat transmission between the first storage cell and the safety device of the second storage cell, which can be implemented by means of the use of the heat-conducting element, so that, for example, premature escape of fire and flames from the storage module in its entirety, in particular from a module housing of the storage module, can be avoided. In the completely manufactured state of the storage module, for example the storage cells are accommodated in the abovementioned module housing. This selective influencing or control of the thermal propagation makes it possible to implement a particularly safe operating mode of the storage device and therefore of the storage module, in particular for vehicle occupants who are situated in the passenger compartment of the motor vehicle. The abovementioned storage module is, for example, the abovementioned storage device or comprises the storage device.

The storage module is, for example, a battery module so that, for example, the respective storage cell is embodied as a battery cell. In particular, the storage module is, for example, a high-voltage battery or part of a high-voltage battery, which has an electrical voltage, in particular an electrical operating voltage, or more than 50 volts, in particular of several hundred volts.

In particular, the thermal propagation described above can be counteracted, for example, by means of the respective safety device. By means of the use of the heat-conducting element and by means of the selective transmission of heat between the respective first storage cell and the safety device of the respective second storage cell, which can be implemented by means of the use of the heat element, it is now possible to activate the respective safety device selectively and, in particular early but not excessively early, so that the thermal event or the thermal propagation in the storage device can be selectively counteracted early, efficiently and effectively. In this context there is, in particular, provision that the safety device can be activated by heat or by a respective temperature of the respective safety device and can therefore be transferred from a deactivated state to an activated state of the safety device. In other words, the respective safety device is, for example, activated as a result of a respective temperature of the respective safety device exceeding an, in particular, predefinable or predefined threshold value. As a result of the use or by means of the heat-generating element it is possible to selectively heat in the way described above, for example, the safety device of the storage cell at which the thermal event has not started so that, for example, as a result the safety device of the storage cell at which the thermal event has actually not started can be activated.

In other words, the thermal event starts, for example, at one of the storage cells so that by means of the heat-conducting element heat can be selectively transferred from the one storage cell to the safety device of the other storage cell which is, for example, directly adjacent to the one storage cell, wherein the thermal event has started at the one storage cell but not at the other storage cell. In this way it is, for example, possible to activate as early as possible the safety device of the other storage cell which is directly adjacent to the one storage cell. If, for example, at least a third storage cell is provided to which the statements above and the following statements regarding the first storage cell and the second storage cell can be transferred, and vice versa, for example at least one further heat-conducting element is provided by means of which heat can be transferred selectively from the first and/or the second storage cell to the safety device of the third storage cell, or vice versa.

In this way it is possible, for example, to activate the safety device of the third storage cell as late as necessary and to activate the safety device of the other, adjacent storage cell as early as possible, in order as a result to bring about, for example, a de-escalation of the thermal propagation or of the thermal event. For this purpose, the respective safety device is used as what is referred to as a propagation de-escalating safety device (PDSD), in order to counteract the thermal propagation or to avoid effects resulting from the thermal propagation or at least for them to occur within particularly narrow limits. In particular, it is possible, by means of the use of the heat-conducting element or of the heat-conducting elements, to adjust the previously described transfer time of the heat or of the wave, that is to say to influence or set it selectively, as a result of which the thermal propagation can be selectively and effectively counteracted by means of the safety devices.

The respective safety device has, for example, a first safety apparatus which is embodied as a disconnecting device by means of which at least the respective storage cell can be disconnected from a circuit of the storage device, in particular galvanically disconnected. By means of this disconnection of the storage cell from the circuit an electrical connection between the circuit and the respective storage cell is interrupted so that the respective storage cell is no longer connected electrically to the circuit.

Alternative or additionally, the respective safety device comprises, for example, a second safety device which is embodied as a short-circuiting device by means of which a short circuit of at least the respective storage cell can be brought about or set. The short circuit which can be brought about by means of the short-circuiting device is preferably an external short circuit, which is also referred to as a storage-cell-external short circuit. The external short circuit cannot be brought about, or is not brought about, by means of the short-circuiting device, for example, within the storage cell or the cell housing but rather outside the respective storage cell or the respective cell housing.

Alternatively or additionally, the respective safety device comprises, for example, a third safety device which is embodied as a degassing device. The degassing device is also referred to as a degassing unit. The respective receptacle space can be degassed by means of the respective degassing device. This is to be understood as meaning, in particular, that by means of the degassing device a fluid, in particular a gas, can be discharged from the respective receptacle space and therefore from the respective cell housing and in this context, in particular, discharged to the surroundings of the respective cell housing, in order as a result to avoid, for example, an excessive internal pressure prevailing in the receptacle space. The abovementioned fluid is produced, for example, from the abovementioned electrolyte during a thermal event. The activation of the short-circuiting device is to be understood in this context as meaning, for example, that the short circuit is not brought about by the short-circuiting device in its deactivated state. The short circuit is brought about or set by means of the short-circuiting device by activating the short-circuiting device. The activation of the disconnecting device is to be understood as meaning, in particular, that in the deactivated state of the disconnecting device the respective storage cell is not disconnected from the circuit or is connected to the circuit. By activating the disconnecting device, the respective storage cell is disconnected from the circuit by means of the disconnecting device. In addition, for example the activation of the degassing device is to be understood as meaning that, for example, at least one outflow opening, embodied, in particular, as a through-opening and embodied, for example, in the respective cell housing, is open by the activation of the degassing device. In the deactivated state of the degassing device, the outflow opening is not opened or closed. As a result of the opening of the outflow device, the aforementioned fluid, in particular the abovementioned gas, can flow out of the respective cell housing, in order as a result to avoid an excessive rise in pressure in the receptacle space or in the respective cell housing.

In particular there can be provision that in particular if the safety device has the three abovementioned safety apparatuses the safety apparatuses are designed to change subsequently from a respective deactivated state into the respective activated state during a critical state profile of the respective storage cell. Within the scope of the critical state profile, or during the critical state profile, for example the respective storage cell changes its state so that in the course of this change of state of the storage cell the safety apparatuses are activated successively, that is to say in chronological succession. Consequently, the safety devices are activated successively, in particular by the change, or as a result of the change, of the state of the storage cell.

The critical state profile is to be understood as meaning, in particular, that during the critical state profile at least one parameter which characterizes the storage cell, in particular its operation or state, is outside a normal range which characterizes a normal mode of the storage cell, wherein, for example, the parameter moves increasingly away from the normal range during the critical state profile. The parameter is, for example, the abovementioned internal pressure which, for example, continuously increases within the scope of the critical state profile, or during the critical state profile, and thus moves increasingly away from its normal range.

In addition, the parameter can be, for example, the abovementioned temperature which increases during the critical state profile. The critical state profile is activated or brought about, for example, by a thermal event as described above, wherein the state profile is advanced, in particular, by the thermal event. This means, in particular, that the thermal event moves the parameter increasingly away from the normal range. This also means, in particular, that, for example, the respective storage cell is transferred by the thermal event from the previously mentioned normal range into the critical state profile, so that the storage cell enters a critical state as a result of the thermal event. The thermal event leads, in particular, to heating of the storage cell. The abovementioned fluid, which can be discharged from the receptacle space by means of the degassing device, results, for example, from such a thermal event and arises, for example, from the abovementioned, in particular fluid, electrolyte, in particular if the latter is heated excessively.

Against this background, it is possible to activate, for example, the safety device of the second storage cell, which is directly adjacent to the first storage cell and follows the first storage cell, as early as possible by means of the heat-conducting element and to activate the safety device of the third storage cell as late as possible, wherein, for example, the third storage cell is directly adjacent to the second storage cell, and therefore directly follows the second storage cell, and wherein, for example, the second storage cell is arranged between the third storage cell and the first storage cell. In this way, for example undesired or unnecessarily early activation of the safety device of the third storage cell can be avoided. Since in this context the safety device of the second storage cell can be activated particularly early, for example a thermal propagation can be counteracted by means of the safety device of the second storage cell during a sufficiently long time period, while the safety device of the third storage cell is still not activated. If, for example the safety apparatus of the second storage cell or the activation of the safety device of the second storage cell is not sufficient to counteract the thermal propagation or to restrict it, the safety device of the third storage cell can be activated in order to counteract the propagation. In this way it is possible, for example, for the thermal propagation to be counteracted in a chronologically successive fashion by means of the safety device of the second storage cell and then by means of the safety device of the third storage cell, so that the thermal propagation overall can be counteracted over a particularly long time period. Consequently, particularly safe operation can be implemented.

In one particularly advantageous embodiment of the invention, the heat-conducting element is arranged on a respective outer side, facing away from the respective receptacle space, of the respective cell housing and is connected in a thermally conductive fashion to the respective outer side. This embodiment is based on the concept of not arranging the heat-conducting element, for example, in the respective storage cell or in the respective cell housing but rather outside the respective cell housing so that a particularly advantageous transfer of heat between the cell housings can be implemented. In particular it is conceivable that the heat-conducting element is connected in a thermally conductive fashion to the respective safety device so that as a result the heat or the thermal wave can be transferred particularly advantageously to the respective safety device. This makes it possible to activate the respective safety device selectively by means of heat which is transferred via the heat-conducting element, so that undesirably early activation of the respective safety device can be avoided but sufficiently early activation of the respective safety device can be implemented.

In order to implement particularly safe operation, in a further refinement of the invention there is provision that the heat-conducting element is embodied so as to be electrically non-conductive. In other words, the heat-conducting element is preferably embodied as a non-conductor, in order to avoid an undesired flow of current. In order to be able to transfer the heat particularly selectively and efficiently, the heat-conducting element is preferably embodied in a ribbon shape.

A further embodiment is defined by the fact that the heat-conducting element is arranged between respective end faces, which face one another, of the cell housings. As a result, for example a particularly advantageous transfer of heat can be implemented, since, for example, heat can be transferred from one of the storage cells to the other storage cell over respective, particularly large, areas. In other words, in this way it is possible for the respective heat-conducting element to make thermally conducting contact with the respective storage cell, in particular the respective cell housing, over a particularly large area.

In a further embodiment of the invention there is provision that at least one insulating element adjoins the heat-conducting element, by means of which insulating element the storage cells are thermally insulated from one another, at least in respective sub-regions. As a result, for example the safety device of the second storage cell can be heated selectively while at the same time excessive or undesired heating of other sub-regions of the second storage cell, in particular its interior, can be avoided. As a result it is possible to avoid, for example, excessive heating of the electrolyte of the second storage cell occurring during selective heating of the safety device of the second storage cell. In particular, despite the transfer of heat from the first storage cell to the safety device of the second storage cell it is possible to avoid a thermal event of the second storage cell occurring. In other words, by using the insulating element it is possible to avoid undesirably early excessive heating of the respective storage cell during which the thermal event does not start or has not started.

The combination of the heat-conducting element and the insulating element makes it possible, in particular, for critical ranges of the second storage cell to be protected against excessive heating and undesired ranges, in particular in the form of the safety device of the second storage cell, to be selectively heated.

In this context it has proven particularly advantageous if the insulating element is arranged between the end faces, which face one another, in order to avoid the transfer of an excessive quantity of heat between the storage cells, in particular between the cell housings.

In order to implement a particularly selective transfer of heat between the storage cells, in particular between the cell housings and in this context to avoid undesirably early excessive heating, in particular of the storage cell, in which the thermal event has not started or is not starting, there is provision in a further refinement of the invention that the respective end faces have respective first sub-regions between which the heat-conducting element is arranged, and respective second sub-regions which adjoin the respective first partial regions and between which the insulating element is arranged, wherein the respective second sub-region is more than twice as large, in particular more three times as large, as the respective first sub-region. This means, for example, that the respective first sub-region has a respective first area content, wherein the respective second sub-region has a respective second area content. In this context, the second area content is more than twice as large, in particular more than three times as large, as the respective first area content.

A second aspect of the invention relates to a storage device for storing electrical energy, in particular for a motor vehicle, having at least two storage cells which each have a cell housing, a receptacle space which is bounded by the cell housing, and at least one storage element which is accommodated in the receptacle space and has the purpose of storing electrical energy.

In order then to be able to implement particularly safe operation, there is provision according to the invention that at least one insulating element is arranged between the storage cells, by means of which insulating element the storage cells are thermally insulated from one another, at least in respective sub-regions. Advantages and advantageous refinements of the first aspect of the invention are to be considered advantages and advantageous refinements of the second aspect of the invention, and vice versa.

As has already been described with respect to the first aspect of the invention, by using the insulating element in the second aspect of the invention it is possible to selectively set or influence mutual transfer of heat and therefore mutual heating of the storage cells, so that, for example, undesirably early excessive heating of the storage cell at which the thermal event has not started can be avoided. Consequently, for example undesirably early activation of the safety device of the storage cell at which the thermal event has not started can be avoided, so that the thermal event or the thermal propagation can be efficiently and effectively counteracted and at the same time, in this context over a particularly long time period. Particularly safe operation can therefore be implemented.

A third aspect of the invention relates to a storage device for storing electrical energy, having at least two storage cells which each have a cell housing, a receptacle space which is bounded by the cell housing, and at least one storage element which is accommodated in the receptacle space and has the purpose of storing electrical energy.

In order then to be able to implement particularly safe operation, according to the invention at least one gas duct is provided by means of which a gas which is produced in a first of the receptacle spaces can be fed from the first receptacle space into the second receptacle space. Advantages and advantageous refinements of the first aspect and of the second aspect of the invention are to be considered advantages and advantageous refinements of the third aspect of the invention, and vice versa.

The gas duct of the third aspect of the invention functions, for example, as the heat-conducting element of the first aspect of the invention, so that, for example, as a result of the fact that the gas which is produced in the first receptacle space is discharged at least partially out of the first receptacle space and conducted into the second receptacle space, the second storage cell, in particular its safety device, can be heated selectively, in order as a result, for example, to be able to activate the safety device of the second storage cell sufficiently early, wherein, for example, the thermal event has not started, for example, at the second storage cell but rather at the first storage cell.

In the first aspect of the invention, the heat-conducting element is, for example, a solid heat-conducting element or a solid body, which therefore does not have a duct through which gas can flow. In the third aspect of the invention, the gas duct is used as a heat-conducting element, wherein the gas can flow through the gas duct so that gas from the first receptacle space can be conducted into the respective second receptacle space, or vice versa, by means of the gas duct. In the case of the second and third aspects of the invention also, chronological adjustment of the described transfer time and therefore of a propagation interval can also be implemented so that, for example, the respective safety devices can be activated according to requirements at advantageous times, or at advantageous states of the storage cells. Consequently, for example the safety device of the second storage cell can be activated as early as possible, and the safety device of the third storage cell can be activated as late as necessary.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures identical or functionally identical elements are provided with the same reference symbols.

DETAILED DESCRIPTION OF THE DRAWINGS

Figure 1:
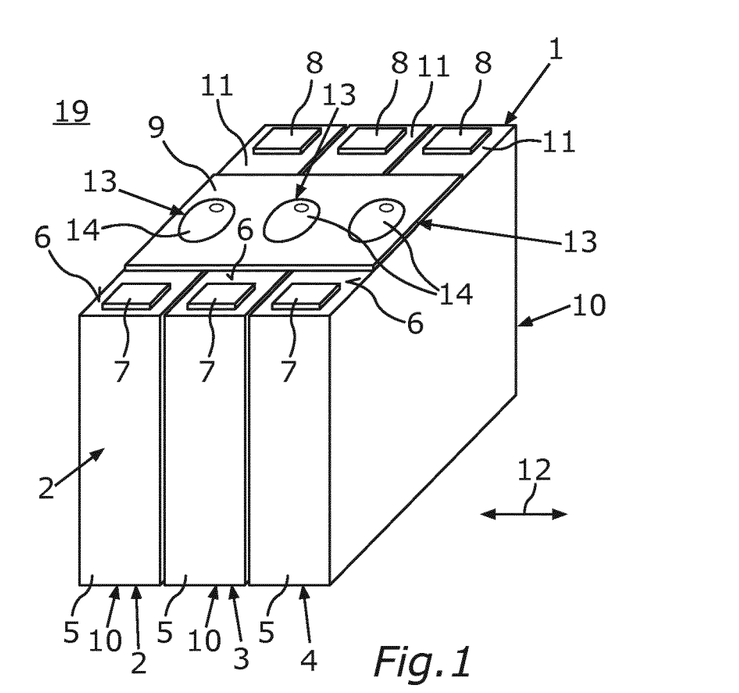
FIG. 1 shows a schematic perspective view of a storage device according to the invention according to a first embodiment.

FIG. 1 shows a first schematic perspective view of a first embodiment of a storage device 1 for storing electrical energy or electrical current. The storage device 1 is, for example, a component of a motor vehicle, in particular of a motor car and preferably of a passenger car which comprises, for example, the storage device 1 and at least one electric machine. For example at least one wheel of the motor vehicle or the motor vehicle overall can be driven electrically by means of the electric machine. For this purpose, the electric machine is operated in a motor mode and therefore as an electric motor. In order to operate the electric machine in its motor mode, the electric machine is supplied with the electrical energy stored in the storage device 1.

The storage device 1 is embodied here, for example, as a battery, in particular as a high-voltage battery (HV battery). In other words, the storage device 1 is preferably embodied as a high-voltage component, so that the storage device 1 has or makes available an electrical voltage, in particular an electrical operating voltage, which is, for example, more than 50 volts, in particular more than 60 volts and preferably more than 100 volts. As a result, particularly large electrical power levels can be implemented for driving the motor vehicle.

The storage device 1 comprises a plurality of storage cells 2, 3 and 4, wherein, for example, the storage cell 2 is a first storage cell of the storage apparatus 1, and is also referred to as a first storage cell. The storage cell 3 is, for example, a second storage cell or is also referred to as a second storage cell, while, for example, the storage cell 4 is a third storage cell and is also referred to as a third storage cell. The storage apparatus 1 comprises, for example, a storage housing which is not illustrated in the figures and is also embodied as a module housing and in which the storage cells 2, 3 and 4 are arranged. For this purpose, for example the storage housing has a receptacle space in which the storage cells 2, 3 and 4 are arranged. For example, the storage cells 2, 3 and 4 form a module, in particular a battery module. The respective storage cells 2, 3 and 4 are embodied, for example, as battery cells.

The respective storage cells 2, 3 and 4 comprise a respective cell housing 5 and a respective receptacle space which is bounded by the respective cell housing 5 and cannot be seen in the figures. The respective storage cells 2, 3 and 4 also have at least one storage element for storing electrical energy, wherein the respective storage element is accommodated in the respective receptacle space and therefore in the respective cell housing 5. In order to store the electrical energy, the respective storage element comprises, for example, at least one electrode device which has at least one electrode and/or at least one electrode coil. The electrode coil is, for example, a winding. In particular the winding comprises, for example, a first electrode in the form of a cathode and a second electrode in the form of an anode, wherein the electrodes are rolled or wound, for example, to form the electrode coil. In particular, the storage element comprises at least one separator which is arranged between the electrodes. The electrode coil can have here, in particular, a jelly roll structure, that is to say be wound or rolled in the manner of a biscuit roll. Furthermore, the storage element comprises, for example, an, in particular fluid, electrolyte which is arranged in the respective receptacle space. In this context, the electrode device is at least partially, in particular at least mainly or completely, immersed in the electrolyte.

The respective storage cells 2, 3 and 4 also have a first connection 7 which is arranged at least partially on an outer side, facing away from the respective receptacle space, of the respective storage cells 2, 3 and 4 and which is electrically connected, for example, to one of the electrodes and as a result forms an electrical minus pole of the respective storage cell 2, 3 or 4. Furthermore, the respective storage cells 2, 3 and 4 have a second connection 8 which is arranged at least partially on the outer side 6 facing away from the receptacle space and which is connected, electrically, for example, to the respective other electrode and as a result forms an electrical positive pole of the respective storage cell 2, 3 or 4. The storage cells 2, 3 and 4 are electrically connected to one another, for example, via their respective connections 7 and 8 and as a result are connected, for example, in series or in parallel, as a result of which a particularly high electrical power level can be implemented for driving the motor vehicle.

The respective storage cells 2, 3 and 4 also have a respective safety device 13 which comprises at least one safety apparatus 14. In the embodiment illustrated in FIG. 1, the respective safety apparatus 14 is embodied as a degassing device by means of which a fluid, in particular a gas, can be discharged from the respective receptacle space, in particular to a respective surrounding area 19 of the respective cell housing 5. For this purpose, for example the respective safety apparatus 14 comprises at least one respective outflow opening which, for example in a deactivated state of the respective safety device 13 or of the respective safety apparatus 14, is fluidically shut off. The respective safety apparatus 14 is activated, for example, by the increasing temperature of the respective cells 2, 3 or 4 and/or by an increasing pressure prevailing in the respective receptacle space, and as a result said safety apparatus 14 is transferred from the respective deactivated state into the respective activated state. The pressure increases, for example, owing to the rising temperature and results from the fact that owing to the thermal event the above-mentioned fluid or gas is produced in the receptacle space. In this context, the gas is produced, in particular, from the electrolyte. In the deactivated state, the respective outflow opening is fluidically shut off, for example, by a closure element, wherein the closure element is, for example, a wall of the respective cell housing 5. If the pressure or the temperature exceeds a, in particular, predefinable or predefined threshold value, that is to say a certain level, the closure element for example fractures and/or tears. In other words, the closure element opens the respective outflow opening so that the gas can flow out of the receptacle space, in particular to the surrounding area 19. As a result, the formation of an excessive internal pressure prevailing in the receptacle space can be avoided.

In order then to be able to implement particularly safe operation of the storage device 1 and therefore of the motor vehicle overall, at least one thermally conductive heat-conducting element 9, which functions as a heat-transferring element, is provided, by means of which element heat can be transferred selectively from at least one of the storage cells 2, 3 and 4 to at least one of the safety devices 13 of the respective other storage cells 2, 3 and 4.

In order to be able to transfer the heat particularly efficiently and effectively, the heat-conducting element 9 is embodied at least essentially in a ribbon shape and therefore as a thermally conductive strip. FIG. 1 shows a first embodiment in which precisely one heat-conducting element 9 is provided. The heat-conducting element 9 is constructed, for example, from a special polymer. In addition, the heat-conducting element 9 is preferably embodied in an electrically non-conductive fashion and therefore as a non-conductor.

If then, for example, a thermal event occurs in the storage cell 2, the storage cell 2, in particular the storage element accommodated in the storage cell 2, heats up strongly within the scope of the thermal event. Such a thermal event can result, for example, from an accident of the motor vehicle and therefore, for example, from an application of force to the storage device 1 owing to an accident. The storage cell 2 is therefore that storage cell of the storage cells 2, 3 and 4 in which the thermal event starts so that, for example, firstly a thermal event does not yet occur in the storage cells 3 and 4. As the thermal event progresses, the storage cell 2 heats up further so that a temperature of the storage cell 2 increases. In this context, the heat-conducting element 9 can transfer heat and therefore a thermal wave from the storage cell 2 to the safety device 13 of the storage cell 3 and/or 4 selectively and according to requirements so that as a result the respective storage device 13 of the storage cell 3 and/or 4 is also heated, even though no thermal event has started or is taking place in the storage cells 3 and 4.

The respective cell housing 5 has, for example, a housing part 10 which at least mainly bounds the receptacle space and which has considered per se an opening via which the receptacle space and therefore the respective storage element is accessible. In addition, the respective cell housing 5 comprises, for example, a respective cover 11, by means of which said opening is shut off. In the first embodiment illustrated in FIG. 1, the heat-conducting element 9 is connected in a thermally conductive fashion to the respective covers 11 so that, for example, the thermal wave can be transferred from the respective cover 11, also referred to as a cell cover, of a respective storage cell of the storage cells 2, 3 and 4 to the respective other cell covers of the other storage cells 2, 3 and 4 and therefore to the respective safety device 13 of the other storage cells 2, 3 and 4. The heat-conducting element 9 is, for example, embodied or arranged in such a way that, for example although at least one element, such as, for example, the cover 11 which at least partially bounds the receptacle space, and therefore the respective safety device 13, are heated selectively, the interior of the storage cells 2, 3 and 4 or their content accommodated in the receptacle space, such as for example, the electrolyte, is not heated.

The storage cells 2, 3 and 4 are arranged here successively or one behind the other along a direction which is illustrated in FIG. 1 by a double arrow 12, wherein the storage cell 3 is arranged between the storage cells 2 and 4 with respect to the specified direction. The storage cell 3 is therefore a storage cell which is directly adjacent to the storage cells 2 and 4, while the storage cell 4 does not directly follow the storage cell 2, or vice versa, since the storage cell 3 is arranged between the storage cells 2 and 4.

In the first embodiment illustrated in FIG. 1, the heat-conducting element 9 is located directly on the respective cover 11. It is also conceivable that the heat-conducting element 9 is arranged directly underneath the respective cell cover 11. In order to be able to implement a particularly advantageous transfer of heat, the heat-conducting element 9 is embodied, for example, in one piece.

In particular, the respective safety device 13 or safety apparatus 14 can be activated thermally. Since heat can now be transferred by means of the heat-conducting element 9, for example from the storage cell 2 at which the thermal event starts or takes place, to the safety devices 13 of the storage cells 3 and 4, for example the safety devices 13 of the storage cells 3 and 4 are activated by the transfer of heat, brought about by means of the heat-conducting element 9, from the storage cell 2 to the safety devices 13 of the storage cells 3 and 4, so that the safety devices 13 of the storage cells 3 and 4 are activated, even though no thermal event is taking place at or in the storage cells 3 and 4. For example, the safety device 13 of the storage cell 2 is activated by the thermal event taking place in the storage cell 2. In this way, the respective safety devices 13 can be activated selectively and according to requirements, so that, for example, the safety device 13 of the storage cell 3 which is directly adjacent to the storage cell 2 can be activated as early as possible, but the safety device 13 of the storage cell 4 can be activated as late as necessary. As a result, for example the thermal event or a thermal propagation can be counteracted efficiently and effectively.

In order to be able to activate the safety devices 13 particularly in accordance with requirements there is preferably provision that the heat-conducting element 9 is connected in a thermally conductive fashion to the safety devices 13, in particular is in direct contact or touches the safety device 13.

Figure 2:
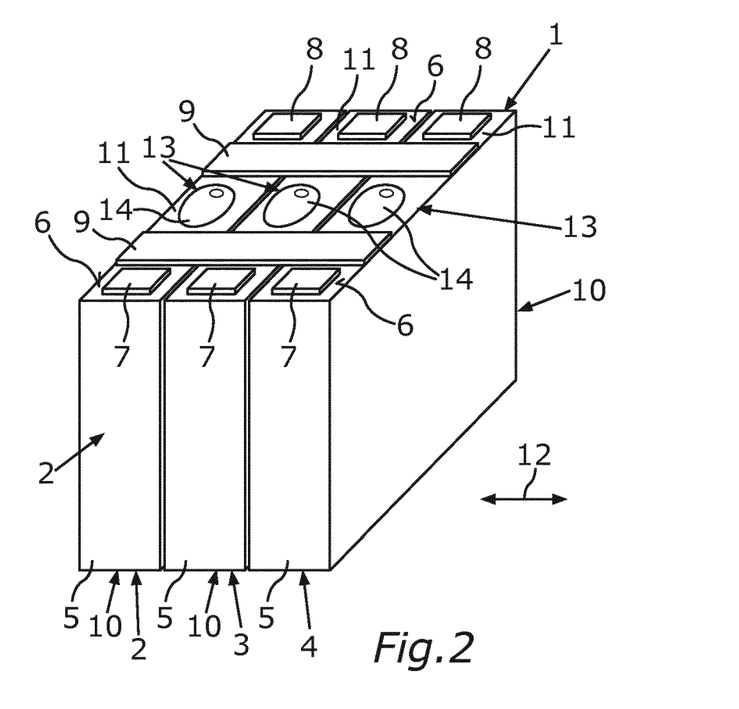
FIG. 2 shows a schematic perspective view of the storage device according to a second embodiment.
Figure 3:
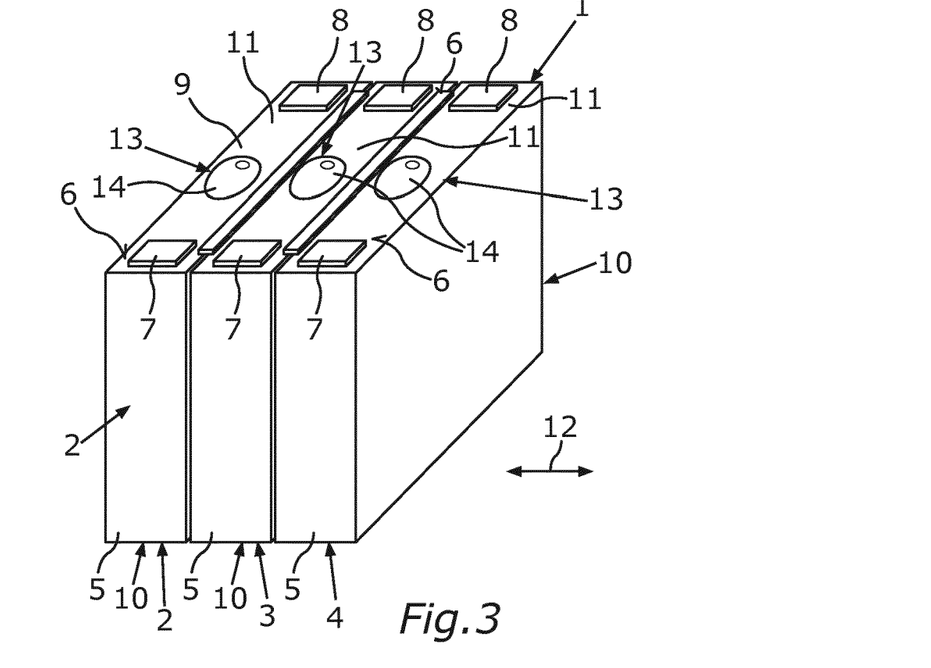
FIG. 3 shows a schematic perspective view of the storage device according to a third embodiment.

FIG. 2 shows a second embodiment in which a plurality of heat-conducting elements 9 which are embodied as thermally conductive strips are provided. In the second embodiment, the respective heat-conducting element 9 is arranged, for example, between the respective connections 7 and 8 and the respective safety device 13. In the first and second embodiments, the respective heat-conducting element 9 has a direction of longitudinal extent which coincides with the direction which is illustrated by the double arrow 12. FIG. 3 shows a third embodiment in which the respective heat-conducting element 9 has a respective direction of longitudinal extent which runs perpendicularly with respect to the direction which is illustrated by the double arrow 12. In this context, the heat-conducting elements 9 in the third embodiment are arranged between the respective safety devices 13.

Figure 4:
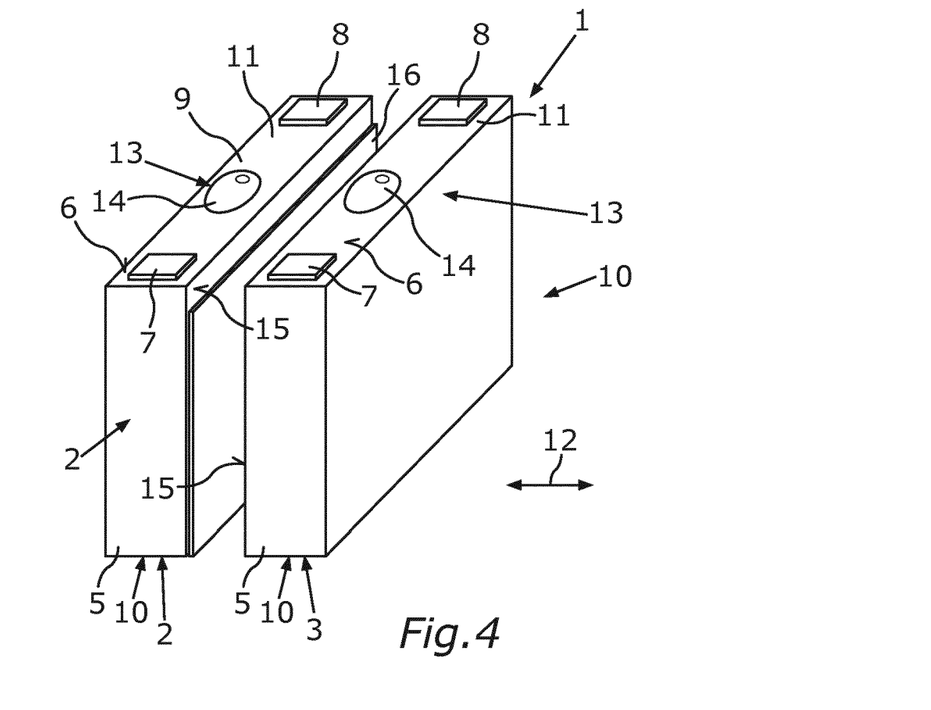
FIG. 4 shows a schematic exploded view of the storage device according to a fourth embodiment.

FIG. 4 shows a fourth embodiment in which at least one insulating element 16 is arranged between the storage cells 2 and 3 and 3 and 4. The insulating element 16 is embodied, for example, as a planar element. In addition, the insulating element 16 is arranged between respective end faces 15, which face one another directly or directly, of the storage cells 2 and 3 and 3 and 4, in particular of the cell housings 5. In this case, the respective end face 15 is at least largely covered toward the respective other end face 15.

The respective storage cells 2 and 3 and 3 and 4 which are directly adjacent are, in particular, at least largely thermally insulated from one another, at least in respective sub-regions, by means of the insulating element 16. In this context, the insulating element 16 is embodied, for example, as a thermally insulating film and/or from a plastic. In particular there is provision that the respective end face 15 is covered completely up to a respective sub-region 17 toward the respective other end face 15 by the insulating element 16, wherein the sub-region 17 is, for example, a respective edge region of the respective end face 15. In particular, the sub-region 17 is an upper edge region which has, for example, a width of a maximum of 5 mm. In particular, the sub-region 17 directly adjoins in the downward direction a face, which faces away from the connections 7 and 8, of the respective cover 11, and is therefore arranged directly underneath the respective cell cover. In this way, particularly advantageous transfer of the thermal wave resulting from the thermal event occurs in a particularly effective and prompt fashion from one of the cell blocks to the respective other, directly adjacent cell cover. At the same time, the transfer of the thermal wave from the interior of the respective cell housing 5 of the respective storage cell 2, 3 or 4 to the cell housing 5 of the respectively directly adjacent cell is slowed down since the insulating element 16 is provided. Therefore, in particular a particularly efficient and effective transfer of heat occurs from the safety device 13 to the safety device 13, while, however, an undesired excessive transfer of heat between the cell housings 5 and the housing parts 10 is avoided per se. As a result, selective activation of the safety device 13 can be brought about without excessive heating of the cell housings 5 per se occurring. In this way, chronological adjustment of the propagation interval is possible, which is to be understood, in particular, as meaning that the respective activation of the respective safety device 13 can be adjusted or set according to requirements, in particular with respect to a time sequence or a time interval in which the safety devices 13 are activated.

Figure 5:
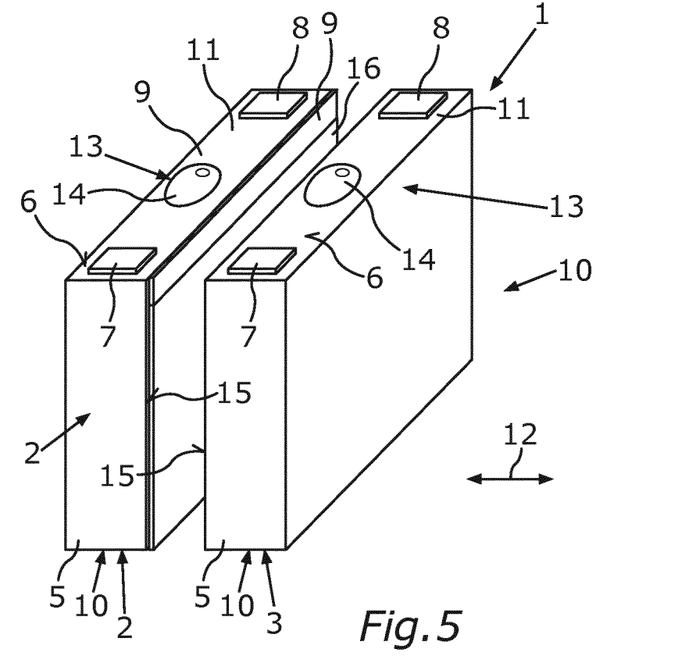
FIG. 5 shows a schematic exploded view of the storage device according to a fifth embodiment.

A further possible way of performing particularly fine adjustment of the propagation interval and therefore, for example, of a reaction time, is illustrated in FIG. 5. The reaction time is to be understood as being, in particular, a time period after the expiry of which the safety device 13 of that storage cell of the storage cells 2, 3 and 4 which is directly adjacent to that storage cell of the storage cells 2, 3 and 4 at which the thermal event starts is activated in the described way.

FIG. 5 shows a fifth embodiment in which the insulating element 16 adjoins the heat-conducting element 9, in particular on a side which faces away from the cover 11, and therefore in the downward direction, in particular directly, which heat-conducting element 9 is arranged in the sub-region 17 and, for example, completely covers the sub-region 17. Therefore, in the fifth embodiment, the heat-conducting element 9 is arranged between the end faces 15 which are directly opposite one another and makes contact, in particular, with the end faces 15. The heat-conducting element 9 therefore extends, for example, over the upper 5 mm, directly underneath the respective cover 11, so that particularly efficient and effective transfer of heat from one cell cover to the other and therefore, in particular, from the safety device 13 to the safety device 13 can be implemented.

Figure 6:
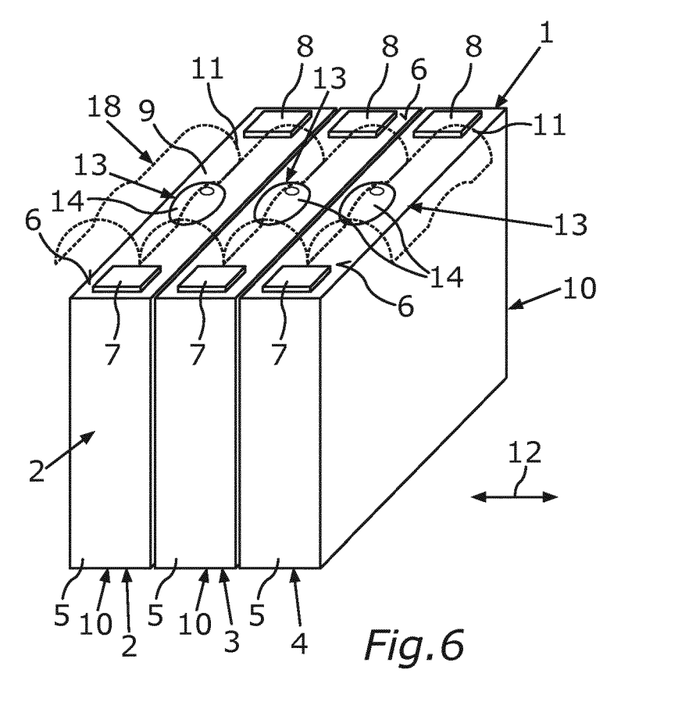
FIG. 6 shows a schematic perspective view of the storage device according to a sixth embodiment.

Finally, FIG. 6 shows a sixth embodiment in which at least one gas duct 18 is provided, by means of which the receptacle spaces are connected fluidically to one another or can be connected fluidically to one another. In this way it is possible to conduct the abovementioned gas which results from the thermal event and is produced in the respective receptacle space, from a respective receptacle space of the receptacle spaces into a respective other receptacle space of the receptacle spaces. If, for example, a thermal event takes place in the storage cell 2, while no thermal event takes place in the storage cells 3 and 4, the specified fluid or gas is produced, for example, in the receptacle space of the storage cell 2. By means of the gas duct 18, the gas can be conducted out of the receptacle space of the storage cell 2 and conducted, for example, into the receptacle space of the directly adjacent storage cell 3 and, for example, into the receptacle space of the subsequent storage cell 4. As a result, the storage cells 3 and 4 and therefore the safety devices 13 thereof can be heated selectively and according to requirements even though the thermal event does not take place in the storage cells 3 and 4 but rather in the storage cell 2. Consequently, the safety devices 13 can be activated according to requirements so that the thermal event and therefore thermal propagation, in particular in the storage housing, can be counteracted effectively and efficiently. Consequently, particularly safe operation can be implemented.

LIST OF REFERENCE NUMBERS

1 Storage device
2 Storage cell
3 Storage cell
4 Storage cell
5 Cell housing
6 Outer side
7 Connection
8 Connection
9 Heat-conducting element
10 Housing part
11 Cover
12 Double arrow
13 Safety device
14 Safety apparatus
15 End face
16 Insulating element
17 Sub-region
18 Gas duct
19 Surrounding area The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage device for storing electrical energy, comprising:
at least two storage cells which each have a cell housing and a cover, a receptacle space which is bounded by the cell housing and the cover, at least one storage element which is accommodated in the receptacle space and has the purpose of storing electrical energy, and at least one activatable safety device comprising a degassing device, each degassing device comprising an outflow through-opening configured to remain closed while a temperature of or pressure within the receptacle space is below a threshold, and configured to open when the temperature of or pressure within the receptacle space exceeds the threshold to allow a flow of gas out of the receptacle space to an exterior of the cell housing; and
at least one thermally conductive heat-conducting strip having a flat, planar ribbon shape having a planar side, wherein the planar side has a width and a length which are both larger than an overall thickness of the heat-conducting strip and includes an opening located at each degassing device such that the gas is able to flow out of the receptacle space and past the heat-conducting strip to the exterior of the cell housing when the degassing device opens, wherein the planar side of the heat-conducting strip is in direct contact with at least the cover of the cell housing of a first storage cell of the at least two storage cells, and wherein the heat-conducting strip is in direct contact with the degassing device of at least a second storage cell of the at least two storage cells while the outflow through-opening of the degassing device of at least the second storage cell is closed, wherein the heat-conducting strip is configured to transfer heat from the cover of the cell housing of the first storage cell to the degassing device of the second storage cell to activate the degassing device of the second storage cell to counteract a thermal propagation event, wherein the heat-conducting strip is electrically non-conductive.

2. The storage device according to claim 1, wherein the heat-conducting strip is arranged on a respective outer side facing away from the respective receptacle space, of the cover of the respective cell housing and is connected in a thermally conductive manner to the respective outer side.

3. The storage device according to claim 1, comprising at least one insulating element configured to thermally insulate the at least two storage cells from one another, at least in respective sub-regions.

4. The storage device according to claim 3, wherein the insulating element is arranged between end faces of the cell housings which face one another.

5. The storage device according to claim 1, wherein the at least two storage cells each have at least one electrical connection pole,
and wherein the heat-conducting strip is not in direct physical contact with the at least one electrical connection pole.

6. A storage device for storing electrical energy, comprising:
at least two storage cells which each have a cell housing and a cover, a receptacle space which is bounded by the cell housing and the cover, at least one storage element which is accommodated in the receptacle space and has the purpose of storing electrical energy, and at least one safety device comprising a degassing device, each degassing device comprising an outflow through-opening configured to remain closed while a temperature of or pressure within the receptacle space is below a threshold, and configured to open when the temperature of or pressure within the receptacle space exceeds the threshold to allow a flow of gas out of the receptacle space to an exterior of the cell housing; and
at least one thermally conductive heat-conducting strip having a flat, planar ribbon shape having a planar side, wherein the planar side has a width and a length which are both larger than an overall thickness of the heat-conducting strip and includes an opening located at each degassing device such that the gas is able to flow out of the receptacle space and past the heat-conducting strip to the exterior of the cell housing when the degassing device opens, wherein the planar side of the heat-conducting strip is in direct contact with at least the cover of the cell housing of a first storage cell of the at least two storage cells and in direct contact with the cover of the cell housing of at least a second storage cell of the at least two storage cells and in thermal contact with the degassing device of at least the second storage cell at least via the cover of the housing of at least the second storage cell, wherein the heat-conducting strip is configured to transfer heat from the cover of the cell housing of the first storage cell to the degassing device of the second storage cell via at least the cover of the housing of at least the second storage cell to activate the degassing device of the second storage cell to counteract a thermal propagation event, wherein the heat-conducting strip is electrically non-conductive.

* * * * *